(12) United States Patent
Schmidt

(10) Patent No.: US 8,956,048 B2
(45) Date of Patent: Feb. 17, 2015

(54) SQUEEZE FILM DAMPER

(75) Inventor: Heiko Schmidt, Muhlhausen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/240,147

(22) PCT Filed: Jul. 17, 2012

(86) PCT No.: PCT/EP2012/063984
§ 371 (c)(1),
(2), (4) Date: Feb. 21, 2014

(87) PCT Pub. No.: WO2013/026626
PCT Pub. Date: Feb. 28, 2013

(65) Prior Publication Data
US 2014/0185974 A1    Jul. 3, 2014

(30) Foreign Application Priority Data
Aug. 23, 2011 (DE) .......................... 10 2011 081 419

(51) Int. Cl.
F16C 27/00    (2006.01)
F16C 27/04    (2006.01)
F16C 19/18    (2006.01)
F16C 33/58    (2006.01)

(52) U.S. Cl.
CPC ............. F16C 27/045 (2013.01); F16C 19/184 (2013.01); F16C 33/58 (2013.01); F16C 19/18 (2013.01); F16C 27/04 (2013.01); F16C 2360/24 (2013.01)

USPC .......................................................... 384/99

(58) Field of Classification Search
USPC ........................................................... 384/99
See application file for complete search history.

(56) References Cited

U.S. PATENT DOCUMENTS

| | | | |
|---|---|---|---|
| 6,109,791 A * | 8/2000 | Metton et al. | 384/99 |
| 6,135,639 A * | 10/2000 | Dede | 384/99 |
| 6,155,720 A | 12/2000 | Battig | |
| 6,682,219 B2 * | 1/2004 | Alam et al. | 384/99 |
| 2007/0036477 A1 | 2/2007 | McKeirnan, Jr. | |
| 2008/0292234 A1 | 11/2008 | Wada et al. | |
| 2009/0110572 A1 | 4/2009 | Meacham et al. | |
| 2011/0064340 A1 * | 3/2011 | Duong et al. | 384/99 |

FOREIGN PATENT DOCUMENTS

| | | |
|---|---|---|
| DE | 2633481 | 2/1978 |
| EP | 0976938 | 2/2000 |

* cited by examiner

*Primary Examiner* — Thomas R Hannon
(74) *Attorney, Agent, or Firm* — Volpe and Koenig, P.C.

(57) ABSTRACT

A squeeze film damper is provided, which includes a bearing cartridge (6), a housing (4), in which the bearing cartridge (6) is accommodated, and a squeeze film in a gap (22) between the housing (4) and the bearing cartridge (6) for producing a damping force directed opposite a circulating radial exciter force, which is generated by an imbalance retained in the bearing cartridge (6). In the squeeze film damper, an arrangement (28) for attenuating the damping force according to the circumferential position are provided around the bearing cartridge (6).

10 Claims, 11 Drawing Sheets

SQUEEZE FILM DAMPER

FIELD OF THE INVENTION

The invention relates to a squeeze film damper and to a bearing arrangement with a squeeze film damper.

BACKGROUND

Squeeze film dampers are used in bearing arrangements with rolling bearings or sliding bearings for damping radial forces that are caused, for example, by imbalances transmitted by the rolling bearings or sliding bearings. In particular, squeeze film dampers are used for the support of high speed rotating shafts, for example, exhaust gas turbochargers.

A squeeze film damper of the type named above is known, for example, from the publication DE 26 33 481 A1. In the bearing cartridge, a shaft is supported by means of a rolling bearing. In the case of an imbalance transmitted by the shaft, the bearing cartridge absorbs a radial excitation force rotating about a bearing center axis to the outside. Without additional fixing means, the bearing cartridge would reorient the excitation force in the radial direction when the shaft is rotating. Therefore, the bearing cartridge is radially held in a housing, wherein a squeeze film is formed between the bearing cartridge and the housing. For a movement of the bearing cartridge to the outside in the radial direction due to the imbalance, oil must be forced from the gap, which leads to a damping force directed opposite the movement.

When the shaft rotates, the bearing cartridge centers itself in the squeeze film damper. The circumferential excitation force acts to the outside and reduces the gap height in the squeeze film. Smaller gap heights here produce a higher resistance or a higher damping force against the movement than larger gap heights. Thus, on average a constant gap between the bearing cartridge and the housing is produced over the circumference and the bearing cartridge centers itself in the housing.

SUMMARY

The invention is solved by the features of the independent claims. Preferred refinements are the subject matter of the dependent claims.

The invention is based on the idea of weakening the damping force produced by the squeeze film along the circumference of the bearing cartridge region-by-region and thus as a function of the circumferential position.

The invention starts from the idea that during operation, a constant gap between the bearing cartridge and housing in the squeeze film damper is produced over the circumference only when no other disrupting forces, such as the force of gravity on the bearing cartridge, a supporting force from an anti-rotation device, and/or a radial force due to the oil pressure distribution in the gap of the squeeze film damper, act on the bearing cartridge. These internal disrupting forces lead to an additional force in the radial direction and can prevent the bearing cartridge from being aligned concentrically in the housing. Thus there is the risk that a residual oil gap will not remain in the squeeze film damper and the walls adjacent to the squeeze film will contact each other. This could be proven in operating bearing cartridges that have been used as internal walls adjacent to a squeeze film. Circumferential contact tracks in a preferred direction could be observed on these cartridges.

Because the disrupting force also acts for a damping force, the invention proposes weakening the capability of the squeeze film to counteract radial movement of the bearing cartridge as a function of the circumferential position about the bearing cartridge region by region and especially at opposing positions with respect to the direction of the disrupting force. This weakening can be realized for any disrupting force individually or for all vector-summed disrupting forces at a common circumferential position in the squeeze film damper about the bearing cartridge. Through such a targeted weakening, the bearing cartridge is moved radially outward during the operation due to the circumferential excitation force at the position of the weakening, which, however, on average compensates the counteracted movement caused by the disrupting force.

The invention therefore provides a squeeze film damper that comprises a bearing cartridge, a housing in which the bearing cartridge is held, and a squeeze film in a gap between the housing and the bearing cartridge for generating a damping force directed against a circumferential radial excitation force that is generated by an imbalance held in the bearing cartridge. According to the invention, in the disclosed squeeze film damper there are means for the region-by-region, circumferential position-dependent weakening of the damping force about the bearing cartridge.

The circumferential position-dependent weakening can be produced, in principle, with any technical means. This can be, for example, spring elements at special positions in the gap of the squeeze film damper that center the bearing cartridge in the housing. Alternatively, the moment of inertia of the bearing cartridge could be changed by targeted material interruptions at certain circumferential positions.

In an especially preferred way, however, the circumferential position-dependent weakening is produced with a region-by-region and circumferential position-dependent change in the gap width in the squeeze film damper. This will be discussed in more detail below.

Through the circumferential position-dependent weakening of the damping force, the individual disrupting forces can be counteracted and a concentric position of the bearing cartridge in the housing can be secured. This prevents the walls adjacent to the squeeze film from bumping against each other, wherein a significant reduction of the bearing loads can be achieved. Consequently, the service life of the bearing is increased. In addition, negative acoustic effects can be reduced.

In one refinement of the invention, the gap is bounded by a guide ring arranged between the bearing cartridge and the housing. Through the use of at least one guide ring, the gap defining the squeeze film can be preassembled separately from the installation of the bearing cartridge or the housing holding the bearing cartridge. In this way, the gap can be installed with minimal tolerance dimensions that permit, in turn, a significant increase in the efficiency of the squeeze film damper.

In the preferred construction of the invention, the gap is expanded in a concentric position of the bearing cartridge and the housing relative to each other as a function of the circumferential position. As already discussed, the bearing cartridge is oriented concentric to the housing only during operation or with a rotating shaft. A gap expansion for the region-by-region weakening of the damping force or the resistance of the squeeze film counteracting a movement is to be inserted into the squeeze film damper not only with simple processing, but also allows relatively exact setting of the weakening of the damping force.

In one special refinement of the invention, the gap is bounded by the housing and expanded by a region-by-region increase in the inner diameter of the housing. If the gap is bounded outward by a guide ring, then the inner diameter of the guide ring is to be expanded accordingly in some regions.

In one preferred refinement of the invention, the gap is limited by the bearing cartridge and expanded by a region-by-region taper of the outer diameter of the bearing cartridge. If the gap is bounded inward by a guide ring, then the outer diameter of the guide ring is to be tapered accordingly. This construction refers to the condition that the bearing cartridge or the guide ring is normally rotationally fixed in the housing so that the region-by-region gap change remains essentially unchanged in its position.

In one especially preferred refinement of the invention, the region-by-region taper of the outer diameter of the bearing cartridge is given by a flattening of a circumferential contour of the bearing cartridge. Such a flattening can be realized with high precision and low cycle times through known metal-cutting or non-metal-cutting production processes, such as milling, grinding or embossing.

In another refinement of the invention, the indicated squeeze film damper comprises additional means for the region-by-region circumferential position-dependent weakening of the damping force at a circumferential position about the bearing cartridge that is different from the circumferential position of the means for the circumferential position-dependent weakening of the damping force. Through the additional means, the damping force can be weakened in a targeted way with respect to individual disrupting forces. In this way it can be prevented that through dominant disrupting forces such as the force of gravity of the bearing cartridge, less dominant disrupting forces are not taken into account. Thus, the bearing cartridge is centered with high precision in the housing, because all disrupting forces over the circumference of the bearing cartridge can be taken into account.

In an additional refinement of the invention, the total weakened damping force produced by both means for the circumferential position-dependent weakening of the damping force is equal to a disrupting force acting on the bearing cartridge, in particular, the force of gravity acting on the bearing cartridge. The provision of two means for the circumferential position-dependent weakening of a single disrupting force makes it possible to provide very high weakening actions. For example, the bearing cartridge cannot be arbitrarily tapered, because it has a limited wall thickness. If the bearing cartridge is tapered at two differential angular circumferential positions, then the sum of the two produced weakening forces can be sufficiently high, in order to adequately counteract, for example, the force of gravity.

In another refinement of the invention, the bearing cartridge has an oil supply groove in which is arranged the means for the circumferential position-dependent weakening of the damping force. In this way, the oil supply groove can contribute to the weakening of the damping force.

The invention also provides a bearing arrangement that comprises a disclosed squeeze film damper and a shaft held in the bearing cartridge.

BRIEF DESCRIPTION OF THE DRAWINGS

Embodiments of the invention will be described in more detail below with reference to a drawing. Shown are.

DETAILED DESCRIPTION OF THE PREFERRED EMBODIMENTS

In the figures, the same elements are provided with the same reference symbols and described only once for a more clear presentation.

Figure 1:
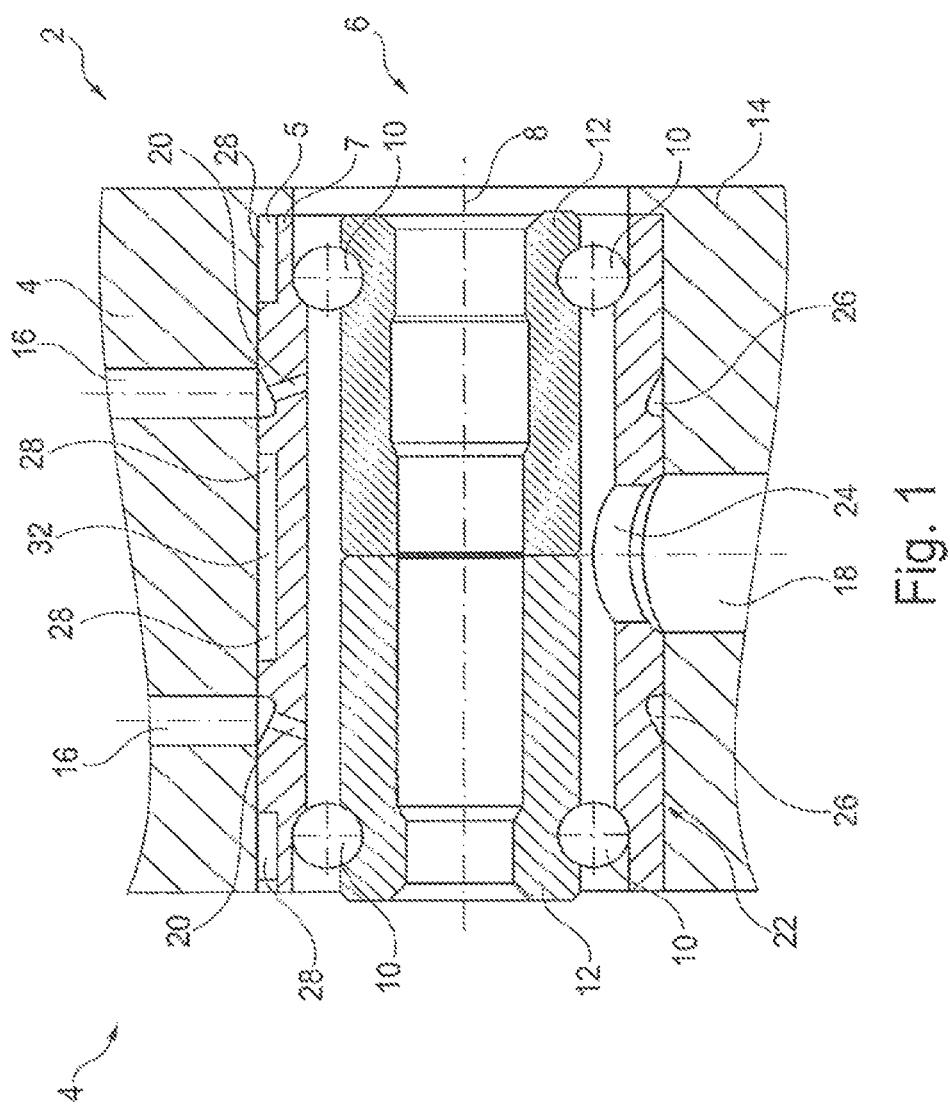
FIG. 1 a longitudinal section representation of a bearing arrangement.

In FIG. 1, a bearing arrangement 2 is shown in a longitudinal section representation. The bearing arrangement 2 has a housing 4 with a chamber 5, for example, in the form of a hole in which a bearing cartridge 6 is held axially and concentrically about a bearing center axis 8. The housing 4 can be, for example, a turbocharger housing. The bearing arrangement 2 is used, in this case, for the support of the turbocharger shaft.

The bearing cartridge 6 is constructed as a rolling bearing in the present example, which is considered non-limiting. Alternatively, the bearing cartridge could also be constructed with other bearing types, for example, a sliding bearing. The bearing cartridge 6 has an outer ring 7 that supports two axially separated inner rings 12 by means of rolling bearings 10 concentric to the bearing center axis 8. The rolling bodies 10 can be held in a not-shown cage. The inner rings 12 can be connected to each other in a rotationally fixed manner by means of a not-shown spring. They are only designed separate from each other due to production reasons. In the inner rings 12, a not-shown shaft can be fixed that can be rotated relative to the outer ring 7 by means of the rolling bodies 10.

The outer ring 7 and thus the bearing cartridge 6 can be fixed in a rotationally fixed manner in the housing 4. The chamber 5 of the housing 4 can have, on an axial end, a taper 14 on which the bearing cartridge 6 is counter-supported by means of the outer ring 7.

Oil can be introduced into the chamber 5 via oil feed channels 16. The introduced oil can bed on one hand for lubricating the rolling bearing or for supplying a still to be described squeeze film damper. The fed oil can be discharged inward from the chamber 5 via the oil discharge channel 18. Likewise, the fed oil can be forced axially outward into the housing 4 and drained off there.

The introduced oil that is used for lubricating the rolling bearing is transported further via lubricating oil feed channels 20 into the bearing cartridge 6 between the outer ring 7 and the inner rings 12. In this way, the friction and the wear of the rolling bodies can be reduced. The oil flow through the bearing cartridge 6 also causes cooling of the components surrounded by the flow.

The introduced oil that is used for supplying the squeeze film damper is pressed into an oil gap 22 between the bearing cartridge 6 and housing 4 and there forms a squeeze film. So that sufficient oil is forced into the oil gap 22 for the squeeze film, the oil feed channels 16 have a larger cross section than the lubricating oil feed channels 20. Before the oil is forced into the oil gap 22 between the bearing cartridge 6 and housing 4, it is distributed uniformly in oil supply grooves 26 via the outer circumference of the outer ring 7 of the bearing cartridge 6. The necessary oil pressure is provided, for example, by an oil pump such as those present in a motor vehicle.

The squeeze film in the oil gap 22 damps radial movements of the bearing cartridge 6 that can be caused, for example, by an imbalance of a rotating shaft fixed in the inner rings 12. The damping becomes greater as the oil gap 22 becomes thinner and thus the bearing cartridge 6 moves closed to the wall of the housing 4. In other words, the squeeze film inhibits movement of the bearing cartridge 6 against the housing 4, so that the bearing cartridge 6 becomes centered in the housing 4 for a rotating shaft.

The lubricating oil feed channels 20 are arranged, for example, on a top side of the bearing cartridge 6, while the lubricating oil discharge channel 24 is arranged on a bottom side of the bearing cartridge 6. Oil from the squeeze film in the gap 22 is forced to the loaded side in the circumferential direction and axially when the shaft is rotating. The oil forced inward is discharged via the oil discharge channel 18. Oil forced radially outward is discharged via the housing 4. The force of gravity of the bearing cartridge 6 acts on the bottom side of the bearing cartridge 6. The force of gravity of the bearing cartridge 6 acts against the radial movement of the bearing cartridge 6 in the direction of its top side. In other words, the force of gravity weakens the effects of the imbalance on the top side of the bearing cartridge 6 and thus the radial movement of the bearing cartridge 6 in the direction of its top side. This can disrupt the centering of the bearing cartridge 6 in the housing 4.

In order to counteract the weakening of the radial movement of the bearing cartridge 6 in the direction of its top side, circumferential position-dependent expansions 28 of the oil gap 22 are formed by a flattening of the outer contour of the bearing cartridge 6 on the top side of the bearing cartridge 6 in some regions. The expansions 28 of the oil gap 22 weaken the damping of the radial movement of the bearing cartridge 6 in the same way as the radial movement of the bearing cartridge 6 is weakened by the force of gravity. The two inner expansions 28 are formed on the top side of the bearing cartridge 6 as an axial increase of an oil discharge groove 32 in some regions, as can be seen for example, in FIG. 4. In this way, a disruption of the centering of the bearing cartridge 6 in the housing 4 is counteracted.

In a similar way, similar expansions 28 of the oil gap 22 can also be provided for other disrupting forces. Alternatively, a common resultant force can be determined from all of the disrupting forces and a corresponding common expansion 28 of the oil gap 22 can be provided.

Figure 2:
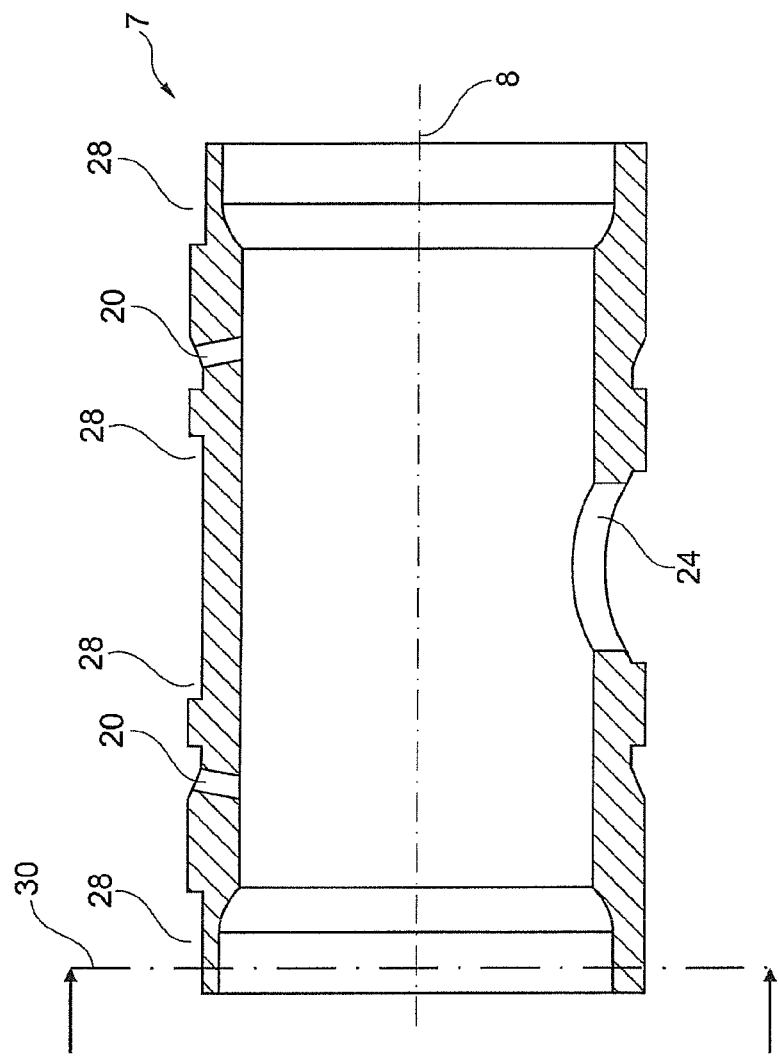
FIG. 2 a longitudinal section representation of the outer ring of a bearing cartridge according to a first embodiment, FIG. 3 a cross-sectional representation of the outer ring from FIG. 2, FIG. 4 a three-dimensional representation of an outer ring according to a second embodiment, FIG. 5 a three-dimensional representation of an outer ring according to a third embodiment, FIG. 6 a three-dimensional representation of an outer ring according to a fourth embodiment, FIG. 7 a three-dimensional representation of an outer ring according to a fifth embodiment, FIG. 8 a three-dimensional representation of an outer ring according to a sixth embodiment, FIG. 9 a three-dimensional representation of an outer ring according to a seventh embodiment, FIG. 10 a three-dimensional representation of an outer ring according to an eighth embodiment, and FIG. 11 a longitudinal section view of two embodiments of a bearing arrangement.
Figure 3:
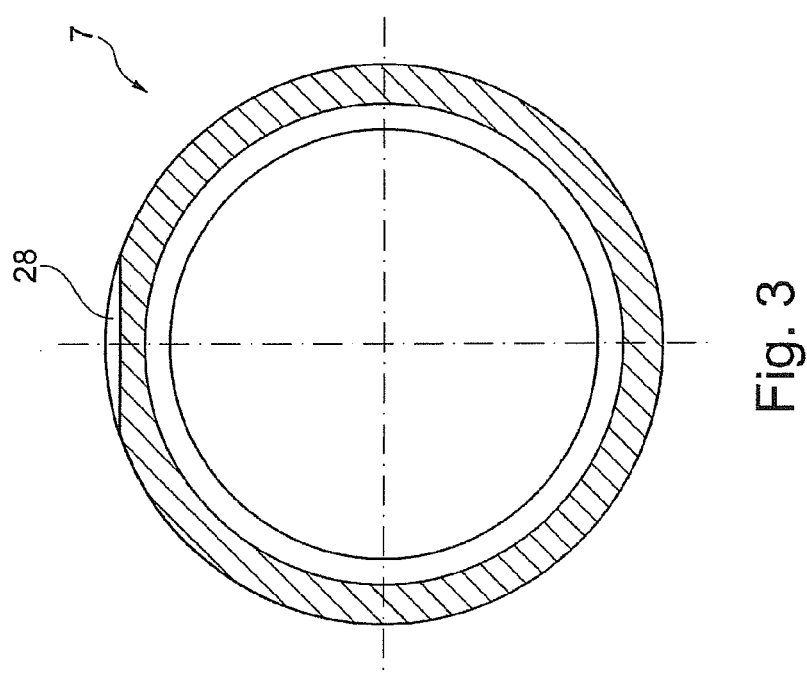

Reference is made to FIGS. 2 and 3 that show a longitudinal section and a cross section of the outer ring 7 of the bearing cartridge 6 accordingly.

The sectional profile 30 of the cross section of FIG. 3 is shown in FIG. 2. It is clearly seen how the expansions 28 of the oil gap 22 are formed as region-by-region flattening of the outer contour on the top side of the bearing cartridge 6.

Figure 4:
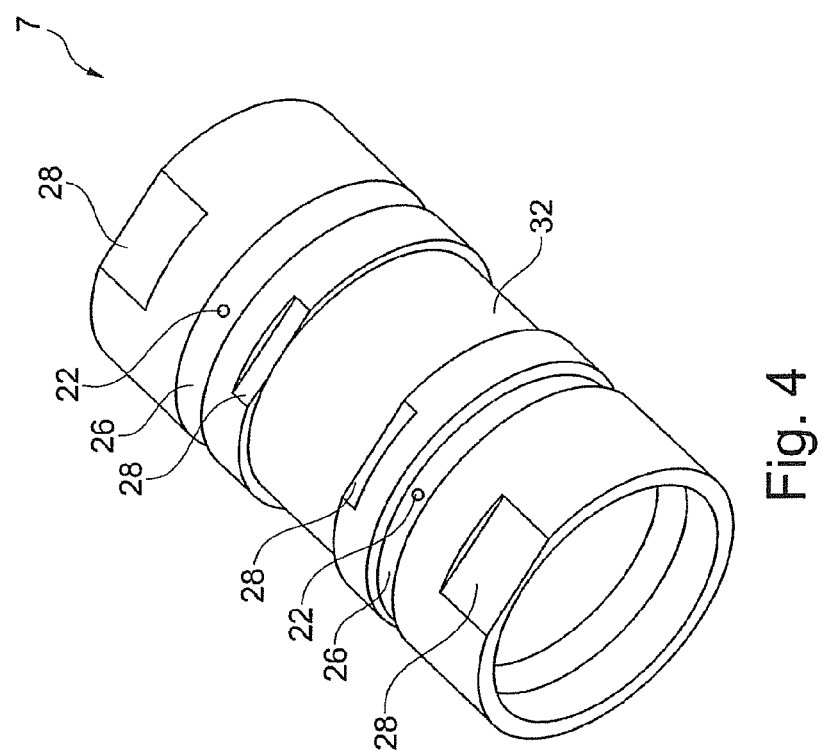

Reference is made to FIG. 4 that shows a three-dimensional representation of an exemplary outer ring 7 of the bearing cartridge 6.

In FIG. 4, the oil discharge groove 32 is easily visible peripherally around the outer ring 7 of the bearing cartridge 6. In this oil discharge groove 32, the oil from the oil gap 22 can collect and escape from the chamber 5 via the oil discharge channel 18. Through the oil discharge groove 32, a constant and uniform oil pressure is formed in the oil gap 22, which further supports the centering of the bearing cartridge 6 in the housing 4. Oil from the oil gap 22 is also pressed axially outward. There it flows out via the housing 4. The inner flattening sections 28 are formed directly on the oil discharge groove 32.

Figure 5:
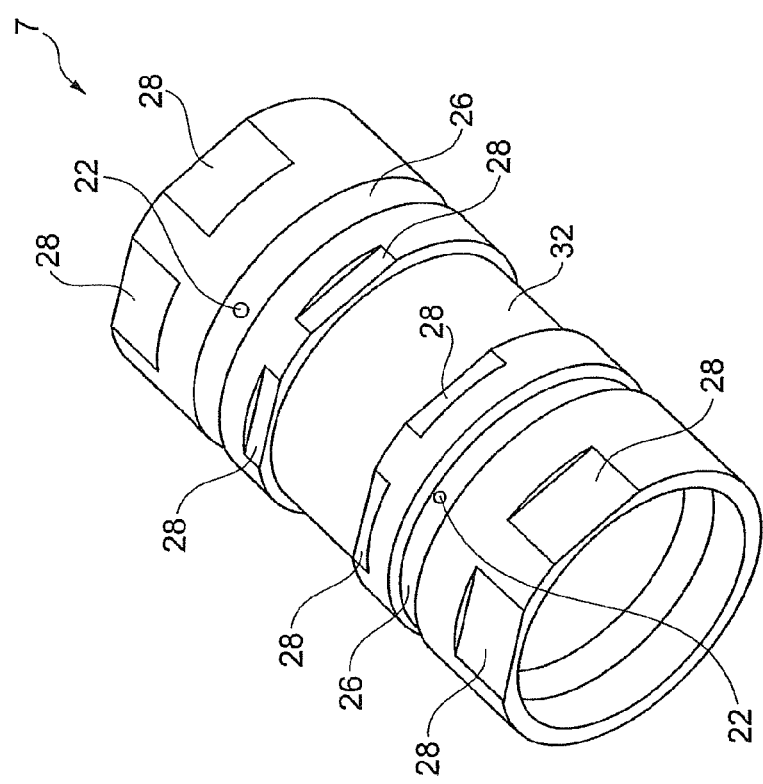

Reference is made to FIG. 5 that shows a three-dimensional representation of another exemplary outer ring 7 of the bearing cartridge 6.

In FIG. 5, the expansions 28 of the oil gap 22 that are formed as flattened sections of the outer contour of the bearing cartridge 6 are arranged at different circumferential positions. In total, the expansions 28 of the oil gap 22 arranged at different circumferential positions can more strongly weaken the damping created by the oil gap 22 of the radial movement of the bearing cartridge 6 in comparison to a single expansion 28 of the oil gap 22 at a single circumferential position on the outer ring 7.

Figure 6:
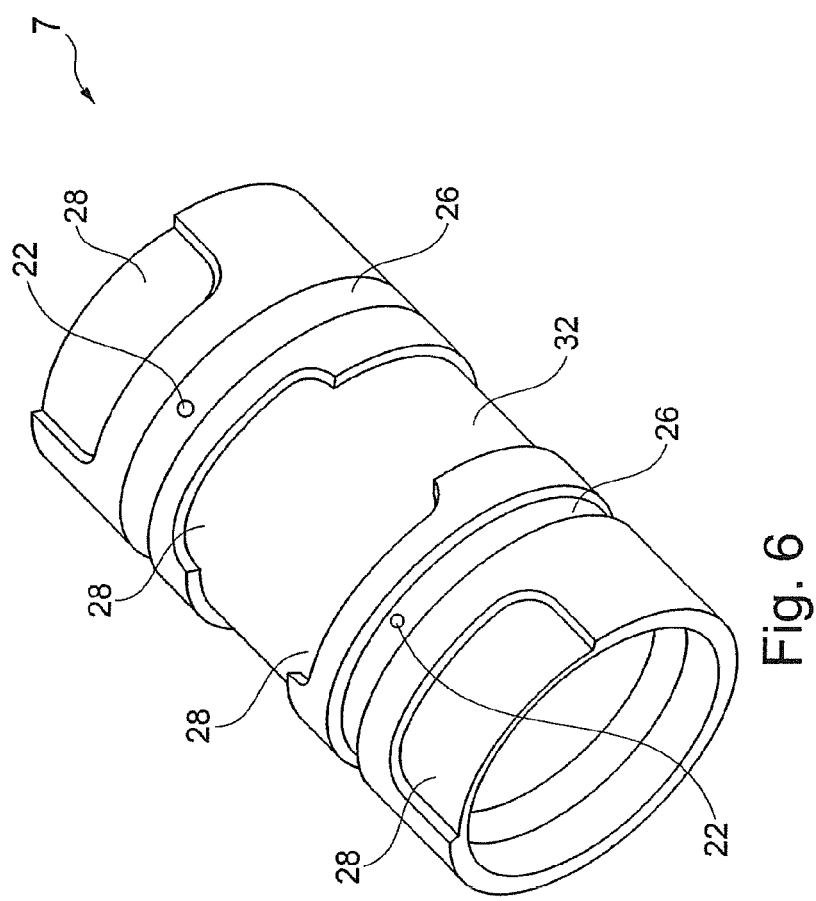

Reference is made to FIG. 6 that shows a three-dimensional representation of another exemplary outer ring 7 of the bearing cartridge 6.

In FIG. 6, the expansions 28 are formed not as flattened sections of the outer contour of the bearing cartridge 6, but as widened sections of the oil discharge groove 32. The widened oil discharge groove 32 enables the damping of the radial movement of the bearing cartridge 6 to be more strongly weakened with a single expansion 28 that is arranged at a single circumferential section on the outer ring 7 than the flattened section according to FIGS. 1 to 4.

Figure 7:
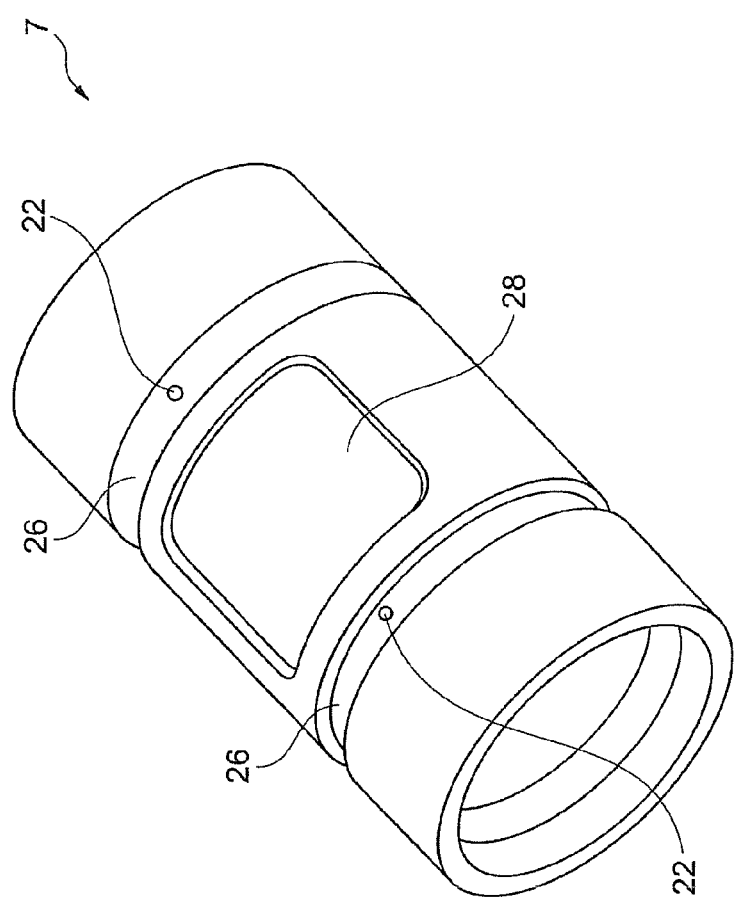

Reference is made to FIG. 7 that shows a three-dimensional representation of another exemplary outer ring 7 of the bearing cartridge 6.

In FIG. 7, the expansions 28 are formed independent of an oil discharge groove 32 as essentially rectangular, rounded recesses in the outer ring 7. In this way, the oil required for weakening the damping of the radial movement of the bearing cartridge 6 can collect in the recess and cannot drain off. Through the resulting reduced oil flow, oil can be saved.

Figure 8:
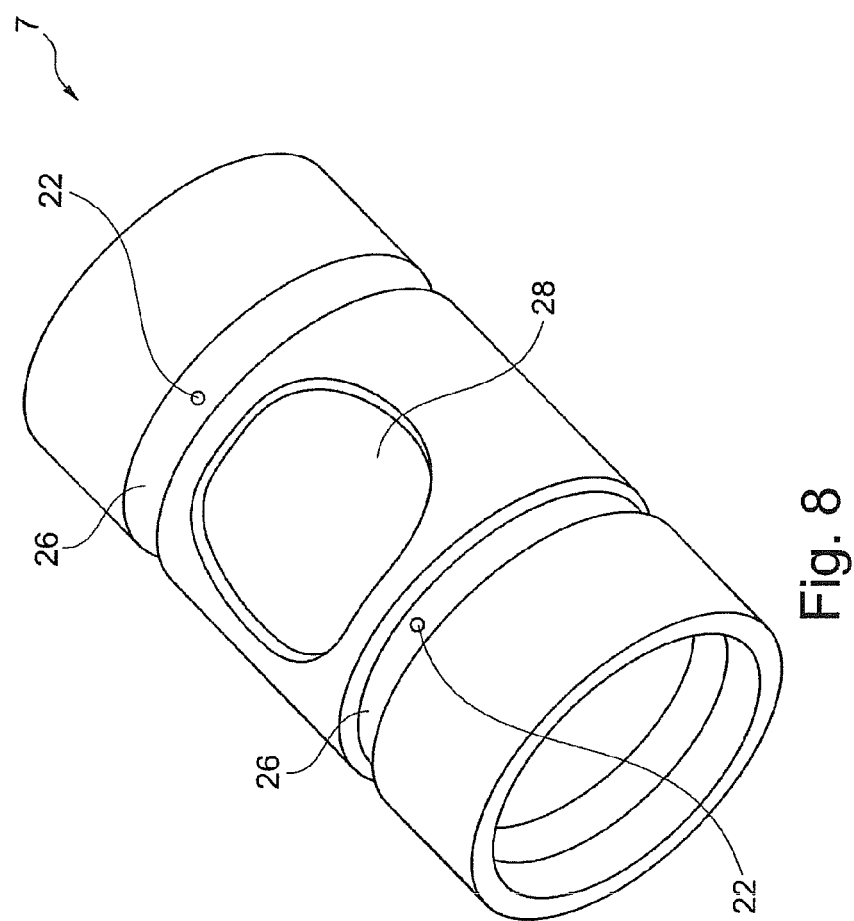

Reference is made to FIG. 8 that shows a three-dimensional representation of another exemplary outer ring 7 of the bearing cartridge 6.

In FIG. 8, the expansions 28 have a round or oval design analogous to FIG. 7 independent of an oil discharge groove 32 as recesses in the outer ring 7. The round or oval design of the recess has the advantage that these can be produced with a milling device in a single processing step, while the essentially rectangular recess of FIG. 7 must be produced in multiple milling steps.

Figure 9:
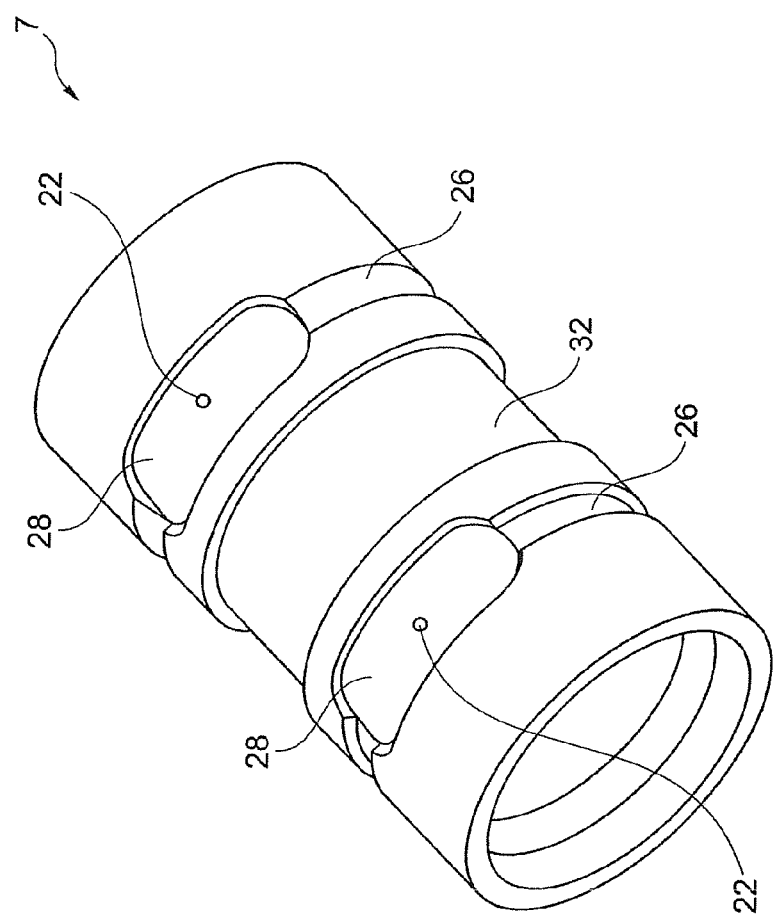

Reference is made to FIG. 9 that shows a three-dimensional representation of another exemplary outer ring 7 of the bearing cartridge 6.

In FIG. 9, the expansions 28 are constructed analogous to FIG. 8 as oval milled recesses in the outer ring 7, but in the oil supply groove 26.

Figure 10:
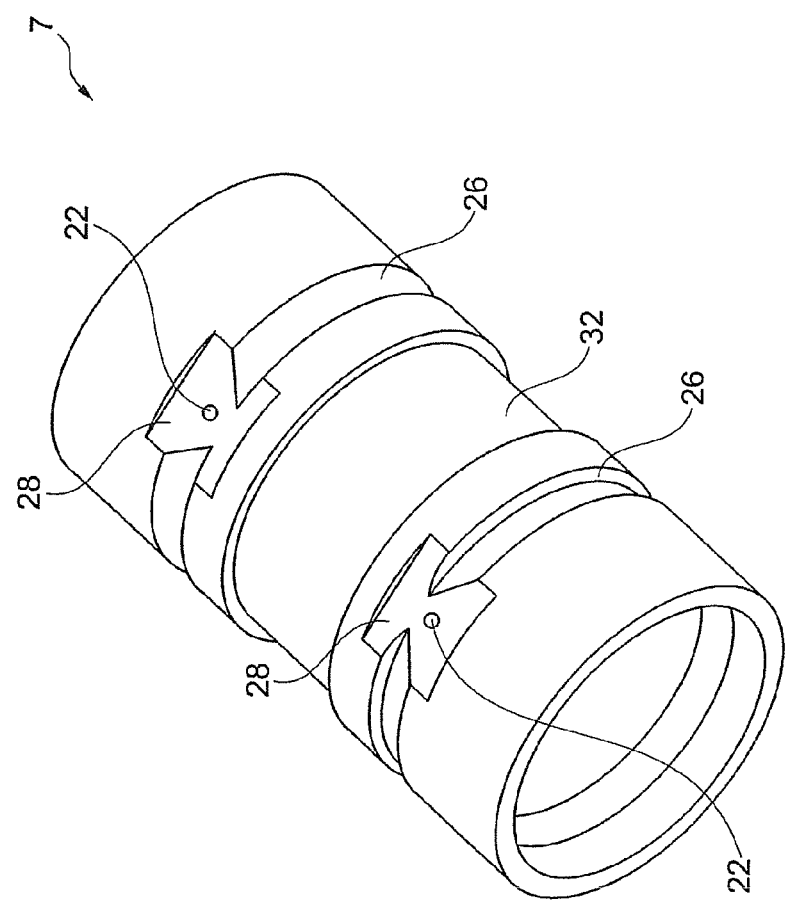

Reference is made to FIG. 10 that shows a three-dimensional representation of another exemplary outer ring 7 of the bearing cartridge 6.

In FIG. 10, the expansions 28 are constructed analogous to FIG. 9 as recesses in the outer ring 7 in the oil supply groove 26 that are milled, stamped, or pressed.

Figure 11:
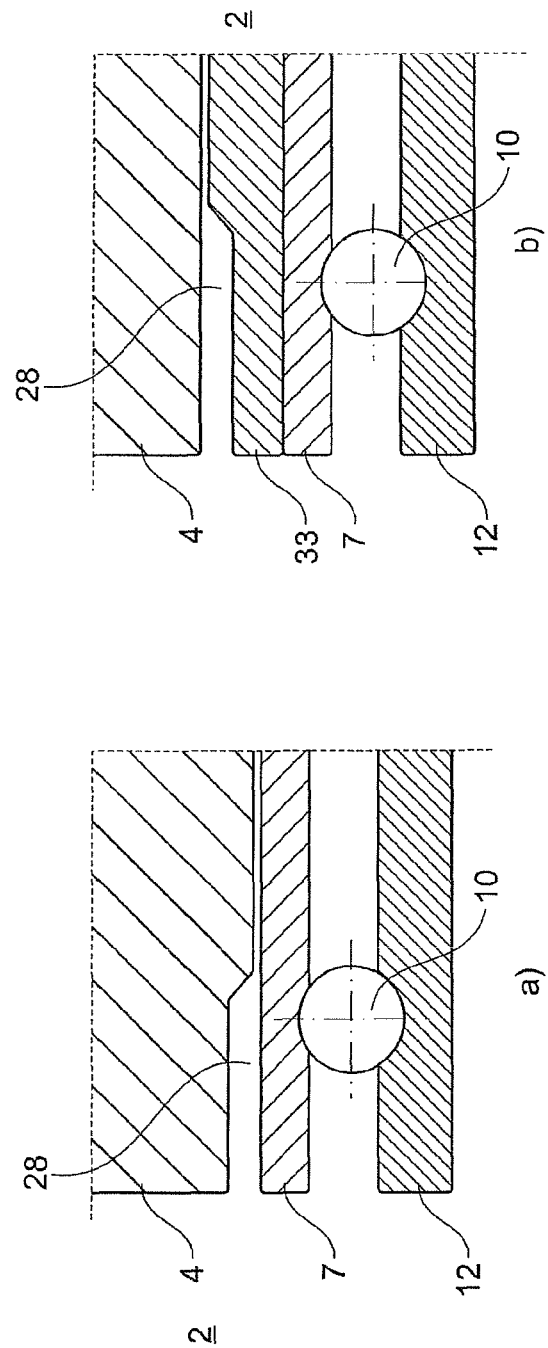

In FIG. 11, two embodiments of a bearing arrangement 2 in a partial longitudinal section representation are shown. According to FIG. 11*a*), the bearing arrangement 2 comprises a housing 4 in which, for the region-by-region expansion of the squeeze film gap, recesses are formed at a circumferential position as gap expansions 28. According to FIG. 11*b*), in the squeeze film gap between the outer ring 7 and housing 4, a guide ring 33 fixed in rotation with the outer ring is inserted. For the circumferential position-dependent weakening of the damping force of the squeeze film, the outer circumference of the guide ring is reduced at a circumferential position of the guide ring 33. The resulting gap expansion 28 is shown.

LIST OF REFERENCE NUMBERS

2 Bearing arrangement
4 Housing
5 Chamber
6 Bearing cartridge
7 Outer ring
8 Bearing center axis
10 Rolling body
12 Inner ring
14 Taper
16 Oil feed channel
18 Oil discharge channel
20 Lubricating oil feed channel
22 Oil gap
24 Lubricating oil discharge channel
26 Oil supply grooves
28 Gap expansion
30 Sectional profile
32 Oil discharge groove
33 Guide ring

The invention claimed is:

1. A squeeze film damper comprising a bearing cartridge, a housing in which the bearing cartridge is held, a squeeze film in a gap between the housing and the bearing cartridge for generating a damping force directed against an all-around radial excitation force that is generated by an imbalance held in the bearing cartridge, a first circumferential position-dependent portion formed on an outer contour of the bearing cartridge for weakening the damping force around the bearing cartridge.

2. The squeeze film damper according to claim 1, wherein the gap is limited by a guide ring between the bearing cartridge and the housing.

3. The squeeze film damper according to claim 1, further comprising a second circumferential position-dependent portion for weakening the damping force at a circumferential position around the bearing cartridge that is different from the circumferential position of the first circumferential position-dependent portion of the damping force.

4. The squeeze film damper according to claim 3, wherein a total weakened damping force caused by both the first and second circumferential position-dependent portions of the damping force is equal to a disruption force applied to the bearing cartridge.

5. A bearing arrangement comprising a squeeze film damper according to claim 1, and a shaft held in the bearing cartridge.

6. A squeeze film damper comprising a bearing cartridge, a housing in which the bearing cartridge is held, a squeeze film in a gap between the housing and the bearing cartridge for generating a damping force directed against an all-around radial excitation force that is generated by an imbalance held in the bearing cartridge, and a first circumferential position-dependent portion for weakening the damping force around the bearing cartridge, wherein the first circumferential position-dependent portion comprises the gap being expanded in a concentric position of the bearing cartridge and the housing relative to each other dependent on a circumferential position.

7. The squeeze film damper according to claim 6, wherein the gap is limited by the housing and is expanded by a region-by-region increase in an inner diameter of the housing.

8. The squeeze film damper according to claim 6, wherein the gap is limited by the bearing cartridge and is expanded by a region-by-region tapering of an outer diameter of the bearing cartridge.

9. The squeeze film damper according to claim 8, wherein the taper of the outer diameter of the bearing cartridge is given as a region-by-region flattening of a peripheral contour of the bearing cartridge.

10. A squeeze film damper comprising a bearing cartridge, a housing in which the bearing cartridge is held, a squeeze film in a gap between the housing and the bearing cartridge for generating a damping force directed against an all-around radial excitation force that is generated by an imbalance held in the bearing cartridge, and a first circumferential position-dependent portion for weakening the damping force around the bearing cartridge, wherein the bearing cartridge has an oil supply groove in which the first circumferential position-dependent portion of the damping force is arranged.

\* \* \* \* \*